Patented Nov. 10, 1953

2,658,927

UNITED STATES PATENT OFFICE 2,658,927

FLUORINATION OF CHLORINE CONTAINING DERIVATIVES OF PARAFFIN HYDROCARBONS

Walter Kwasnik, Leverkusen-Bayerwerk, Germany, assignor to Farbenfabriken Bayer Aktiengesellschaft, Leverkusen, Germany, a corporation of Germany No Drawing. Application February 20, 1952, Serial No. 272,710

Claims priority, application Germany March 8, 1951

1 Claim. (Cl. 260—653)

The present invention relates to a process of fluorinating chlorine-containing derivatives of paraffin hydrocarbons, and more particularly concerns the fluorination of chlorine-containing derivatives of paraffin hydrocarbons in the presence of antimony halides and thionyl chloride.

It is a well established practice in the art to convert chlorine containing derivatives of paraffin hydrocarbons, for instance hexachloro ethane, chloroform, and tetrachloro methane, into fluorine-containing derivatives, for instance trifluoro trichloro ethane, fluoroform and trifluoro chloro methane, by reacting the chlorine-containing derivatives with hydrogen fluoride in the presence of antimony halides as catalysts. This prior art method, however, can only successfully be performed by means of hydrogen fluoride which is absolutely anhydrous. The use of hydrogen fluoride containing minor amounts of water, say up to 2 per cent, does not result in a complete substitution of the chlorine atoms by fluorine atoms. In the fluorination process in which only part of the chlorine atoms in the molecule is substituted, the efficiency of the catalyst is soon materially decreased due to hydrolysis, which requires a considerably high consumption of catalyst referred to the yield of the resulting end product.

This invention has for an object the provision of a novel fluorinating process which is more simple and substantially more economic than known processes for fluorinating chlorine-containing derivatives of paraffin hydrocarbons.

In accordance with the invention, we have surprisingly found that the above said prior art fluorination process achieved with absolutely anhydrous hydrogen fluoride can also be carried out with hydrogen fluoride containing water by adding to the reactants thionyl chloride, $SOCl_2$, in quantities equivalent to the water content of hydrogen fluoride. The reaction occurring between thionyl chloride and the water contained in the hydrogen fluoride proceeds substantially more rapidly than the reaction of the antimony halides with the water; therefore, the catalyst is not decomposed by the interaction of water. The reaction according to the invention proceeds according to the following equations:

I 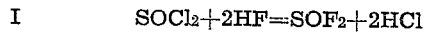

II 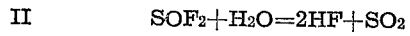

The products, $SO_2$ and $HCl$, formed in the dehydration reaction do not react with the antimony catalyst so that the efficiency and lifetime of the catalyst are not lessened by secondary reactions. The fluorination reaction is not handicapped by an excess of thionyl chloride since the hydrogen fluoride always present in excess converts any excess of thionyl chloride into thionyl fluoride according to Equation I, the thionyl fluoride thus formed escaping from the reaction vessel in the form of gas.

Though it has already been known to liberate hydrogen fluoride from traces of water by dropping in thionyl chloride (K. Wiechert "Die Chemie" 56 (1943) 333 and K. Wiechert, Z. anorg. Chem. 261 (1950) 310) it could not be predicted that the water content of the hydrogen fluoride is sooner adsorbed by the thionyl chloride in mixture with the antimony catalyst than by the antimony catalyst which is highly sensitive to moisture. Furthermore, it could not be foreseen that the antimony catalyst is not affected by the products formed in the reaction between thionyl chloride and water.

The fluorine containing paraffin hydrocarbons obtained according to the invention may be used as cooling agents for refrigerators, as starting materials in the manufacture of fluorine containing plastics and furthermore as non-combustible solvents.

The invention is further illustrated by the following examples, however, is not intended to be restricted thereto.

*Example 1*

2 kilograms of antimony pentachloride, 20 milliliters of thionyl chloride and 2.15 kilograms of hexachloro ethane are introduced into a 5 liter stirring vessel of stainless steel. 1 kilogram of hydrogen fluoride containing 0.6 per cent of water is added under pressure and the mixture is heated with stirring to 120° C. for three hours, the pressure rising to about 50 atmospheres. The resulting hydrogen chloride is discharged during the reaction by means of a valve through an iron reflux condenser kept at a temperature of 20° C. and the reaction product, trifluoro trichloro ethane (B. P.+47.6° C.), is distilled off at +50° C. under atmospheric pressure.

Another run is prepared in the vessel by filling in 2.15 kilograms of hexachloro ethane, 20 milliliters of thionyl chloride and 700 grams of hydrogen fluorine containing 0.6 per cent of water. The catalyst may be used repeatedly and is very effective even after seventy runs. When carrying out the reaction, however, in the absence of thionyl chloride the efficiency of the catalyst is reduced on account of the water content (0.6 per cent) of the hydrogen fluoride already after the sixth run to such an extent that the reaction no longer gives rise to the formation of trifluoro trichloro ethane but to difluoro tetrachloro ethane (B. P.+91.5° C.) and monofluoropentachloro ethane (B. P.+138 C.°).

Example 2

2 kilograms of antimony pentachloride and 1 kilogram of chloroform are filled into a 5 liter stirring apparatus of stainless steel. 1 kilogram of hydrogen fluoride (96 per cent HF and 4 per cent of H₂O) is added under pressure and the mixture is heated with stirring at 80° C. for three hours, the pressure rising to about 60 atmospheres. The products, i. e. hydrogen chloride and difluoro chloro methane (B. P. —40.8° C.), formed in the reaction are discharged through an iron reflux condenser kept at a temperature of 20° C. The second run is prepared by charging 240 milliliters of thionyl chloride, 1 kilogram of chloroform and 350 grams of hydrogen fluoride of the same concentration. The catalyst may be used repeatedly and is very effective after fifteen runs. If the reaction, however, is carried out without the addition of thionyl chloride, the efficiency of the catalyst is reduced already after the third run to such an extent that no difluoro chloro methane but onyl monofluoro dichloro methane (B. P. +8.9° C.) is obtained.

Example 3

2 kilograms of antimony pentachloride, 40 milliliters of thionyl chloride and 2 kilograms of tetrachloro methane are filled into a 5 liter stirring apparatus of stainless steel. 1.5 kilograms of hydrogen fluoride (98.2 per cent HF and 1.8 per cent H₂O) are added thereto under pressure and the mixture is heated with stirring at 160° C. for 3 hours, the pressure rising to about 80 atmospheres. The reaction products, i. e. hydrogen chloride and trifluoro chloro methane (B. P. —81° C.), are discharged during reaction through an iron reflux condenser kept at a temperature of 20° C. The second run is prepared by charging 40 milliliters of thionyl chloride, 2 kilograms of tetrachloro methane and 760 grams of hydrogen fluoride of the same concentration. More than 25 runs may be prepared without a decrease of the efficiency of the catalyst being observed. If the reactions, however, are carried out without the addition of thionyl chloride, the efficiency of the catalyst is reduced already after the third run to such an extent that no trifluoro chloro methane but mono fluoro trichloro methane (B. P. +23.7° C.) and some difluoro dichloro methane (B. P. —29.8° C.) are formed.

I claim:

In the fluorination of chlorine containing derivatives of paraffin hydrocarbons in the presence of an antimony halide by means of hydrogen fluoride containing water, the step which comprises performing the fluorination in the presence of an amount of thionyl chloride at least chemically equivalent to the amount of water contained in the hydrogen fluoride.

WALTER KWASNIK.

References Cited in the file of this patent

UNITED STATES PATENTS

| Number | Name | Date |
|---|---|---|
| 2,537,777 | McBee | Jan. 9, 1951 |
| 2,549,988 | Perkins | Apr. 24, 1951 |
| 2,569,644 | Stilmar | Oct. 2, 1951 |
| 2,576,823 | Benning et al. | Nov. 27, 1951 |